US 8,533,841 B2
Sep. 10, 2013

(12) United States Patent
Kulkarni et al.

(10) Patent No.: US 8,533,841 B2
(45) Date of Patent: Sep. 10, 2013

(54) DERIVING REMEDIATIONS FROM SECURITY COMPLIANCE RULES

(75) Inventors: Amit Raghunath Kulkarni, Bellevue, WA (US); Arindam Chatterjee, Redmond, WA (US); Tristan Brown, Keller, TX (US)

(73) Assignee: Microsoft Corporation, Redmond, WA (US)

( * ) Notice: Subject to any disclaimer, the term of this patent is extended or adjusted under 35 U.S.C. 154(b) by 1370 days.

(21) Appl. No.: 11/695,351

(22) Filed: Apr. 2, 2007

(65) Prior Publication Data

US 2008/0244690 A1    Oct. 2, 2008

(51) Int. Cl.
*H04L 9/32* (2006.01)
(52) U.S. Cl.
USPC .......................................................... 726/25
(58) Field of Classification Search
USPC ................................... 726/1, 2, 25
See application file for complete search history.

(56) References Cited

U.S. PATENT DOCUMENTS

| | | | |
|---|---|---|---|
| 7,000,247 B2 | 2/2006 | Banzhof | |
| 2004/0059920 A1 | 3/2004 | Godwin | |
| 2004/0117624 A1* | 6/2004 | Brandt et al. | 713/166 |
| 2006/0015941 A1 | 1/2006 | McKenna | |
| 2006/0048142 A1 | 3/2006 | Roese et al. | |
| 2006/0101520 A1* | 5/2006 | Schumaker et al. | 726/25 |
| 2006/0184995 A1 | 8/2006 | Backes et al. | |
| 2006/0212487 A1 | 9/2006 | Kennis et al. | |
| 2006/0212932 A1 | 9/2006 | Patrick et al. | |
| 2006/0218639 A1* | 9/2006 | Newman et al. | 726/25 |
| 2006/0259972 A2 | 11/2006 | Oliphant | |
| 2006/0277591 A1* | 12/2006 | Arnold et al. | 726/1 |
| 2007/0143851 A1* | 6/2007 | Nicodemus et al. | 726/25 |
| 2007/0180490 A1* | 8/2007 | Renzi et al. | 726/1 |

OTHER PUBLICATIONS

L. P. Kaelbling, M. Littman, A. Moore, "Reinforcement Learning: A Survey", Journal of Artificial Intelligence Research, vol. 4, 1996 pp. 1-50.*
Richard Langston. Network Access Control Technologies and Sygate Compliance on Contact. Copyright 2005, Sygate Technologies, Inc. http://www.softwarespectrum.com/symantec/docs/WP-Sygate-Network-Access-Control.pdf.
IBM and Cisco deliver Automated End Point Security Compliance and Remediation. http://www-03.ibm.com/security/cisco/docs/20041014-compliance-remediation-brief.pdf. Last accessed Feb. 15, 2007.
Automated Compliance Reporting for Fortinet Unified Management Systems. http://www.fortinet.com/doc/whitepaper/AutomatedCompliance.pdf. Last accessed Feb. 15, 2007.

* cited by examiner

*Primary Examiner* — Ellen Tran (57) ABSTRACT

Systems and methods that automatically generate remediation processes such as acts performed as part of a benchmark model, to improve and update compliance of a machine with security policies compliance. A remediation component can automatically determine processes that are required to change and increase compliance of a machine with a security policy, and hence improve security level thereof.

19 Claims, 11 Drawing Sheets

DERIVING REMEDIATIONS FROM SECURITY COMPLIANCE RULES

BACKGROUND

Analysis of computer systems with respect to security and performance has proven useful during development and design of associated applications. For example, it can be particularly advantageous to update the systems' security analysis during lifetime of the system software and related applications. Conventionally, the application life cycle lacks security engineering and analysis thereby prompting retroactive measures to address identified security attacks and issues.

Today, when developing an application, it is oftentimes difficult to predict how the application will react under real-world conditions. Put differently, it can become difficult to predict security vulnerabilities of an application prior to and during development and/or before completion. Frequently, upon completion, a developer will have to modify the application or the system itself, to adhere to real-world conditions and threats of attacks. Such modifications can consume many hours of programming time and delay application deployment; hence increasing related expenses.

Traditionally, security designs for systems and applications security are oftentimes random and inefficient. Accordingly, applications and data associated therewith can become vulnerable to threats and malicious attacks. In general, software practitioners lack an expertise to effectively predict system vulnerabilities and associated attacks. For example, despite best efforts by system designers, network communications are continuously hacked and spied upon, and valuable information stolen regularly. Private networks run the risk of unauthorized access, wherein stolen data can relate to confidential business, financial and personal information, for example.

While some threats and attacks can be estimated with some crude level of certainty, for many threats such is not the case. For those security criterions that can be estimated prior to development, this estimate most often requires substantial amount of research and guesswork in order to most accurately determine the criterion. Such conventional guesswork approach for security analysis typically lacks any founded benchmark. Moreover, these conventional approaches are not in general effective or systematic.

Rather, conventional security approaches are based upon a trial-and-error mechanism. In other words, traditional systems tend to be reactive as users lack the expertise necessary to formulate a proactive security mechanism. As such, these traditional trial-and-error approaches lead to costly interruptions and expensive programming time in order to rectify issues as they arise.

Accordingly, traditional security patching of systems do not proactively (and efficiently) address security issues from the beginning to the end during system life time. Hence, developers often find themselves addressing security and performance issues after the fact—after development is complete. This retroactive modeling approach is extremely costly and time consuming to the application life cycle.

Moreover, conventional security policies are "imperative". They enumerate a set of system parameters and associate them with their recommended values. In this model, policy configuration involves setting all the system parameters to their recommended values. However, this model suffers from a major drawback, wherein security policy managers need to define separate policies for each acceptable combination of system parameters, and as a result end up with a large number of policies.

In addition, benchmark based models define the policy as a set of rules in form of expression trees. System parameter checks are the leaf nodes in the expression trees. During security state analysis every expression tree is evaluated to determine the pass/fail status of the rules. A score based on the passing rules can be assigned to the benchmark indicating the security compliance level of the machine. This model can express multiple acceptable security configurations in the same policy document and performs relatively well for analyzing compliance. However, it can complicate tasks of generating configuration/remediation steps to bring a machine to an acceptable state of compliance.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for systems and methods that automatically generate remediation processes (e.g., acts performed as part of a benchmark model), to improve and update compliance of a machine with security policies, via employing a remediation component. Such remediation component can automatically determine processes that are required to change and increase compliance of a machine with a predetermined security policy, and hence automatically improve a security level of the machine.

In a related aspect, the remediation component can interact with an evaluator component and a compliance scoring component. The evaluator component can examine a security policy and/or associated benchmark and collect values (e.g., via a parsing component that parses data) related to settings of interests (e.g., for evaluation of the checks and benchmarks.) In addition, the compliance scoring component can then examine associated logic of the rules involved (e.g., Boolean Logic), and generate a report of the compliance score. For example, if the score represents 100%, the machine is fully compliant with the security policy. Nonetheless, if the score is less then such full compliance, an option exists to supply the data related to the security policy to the remediation component. Subsequently, the remediation component can perform a set of processes to determine further actions to change the system value and increase score of the compliance.

In a related aspect, the remediation component can receive typically all settings and the scores that are associated with the rules of a security policy. In general, to allow a rule to pass, a particular set of checks associated therewith are required to pass. The remediation component receives (e.g., as input) data related to benchmarks and pass/fail results that are associated with rules of the security policy. Subsequently, the remediation component can initiate operation at a check level of the rules that have failed to pass, and attempt to tweak settings and verify whether a rule will subsequently pass or fail. The minimum number of changes that can cause a rule to pass can then be determined—(e.g., via a linear programming—such as brute force strategy that attempts to make as many conditions pass as possible, and typically without assessing whether the condition belongs to a rule that already is in the pass state. In addition, other methodologies such as: heuristic search strategies; artificial intelligence; and the like can further be employed to determine minimum number of changes that are required to be made for rules to pass, and to further increase system compliance with the security policy.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
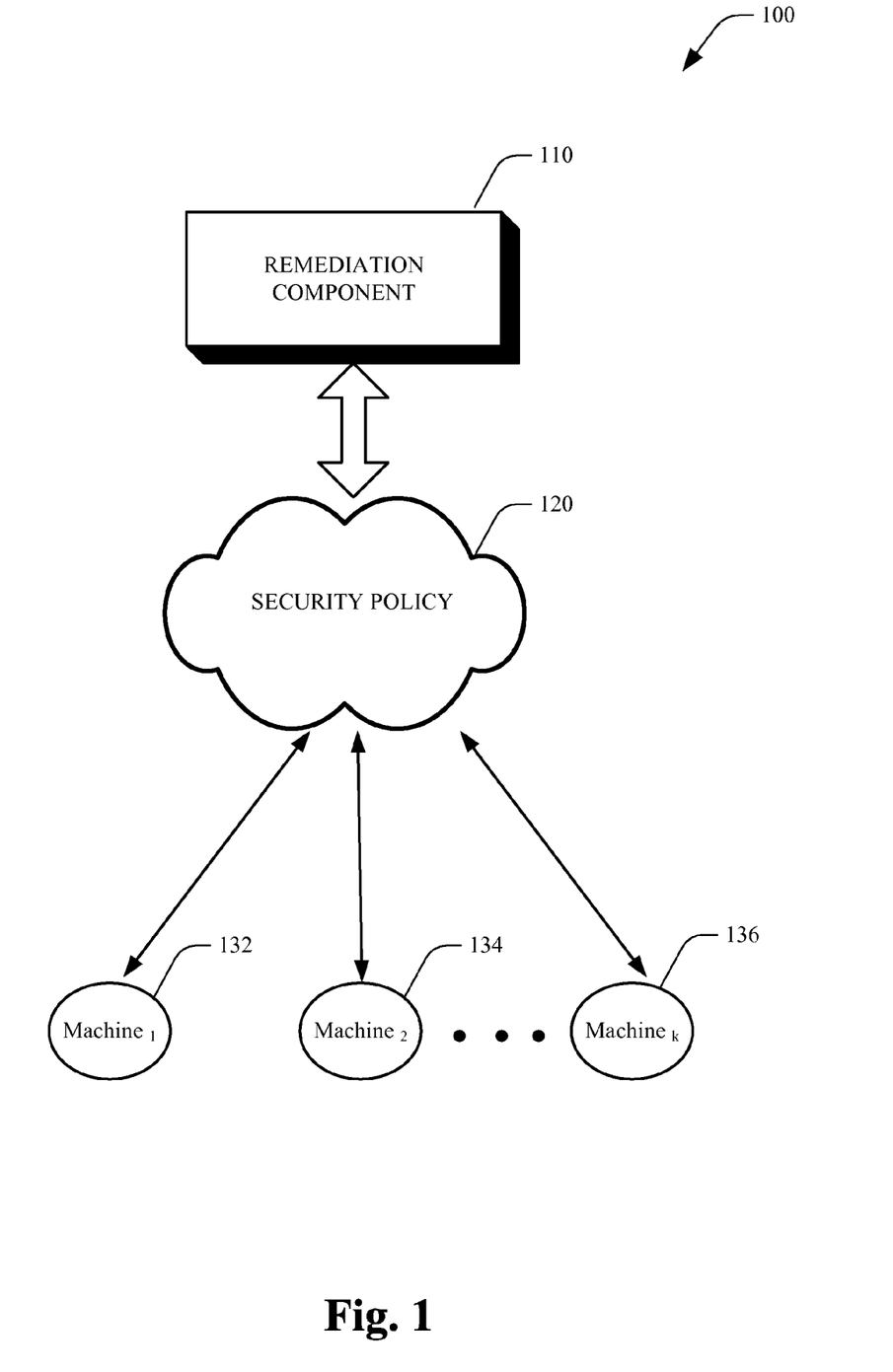
FIG. 1 illustrates a block diagram of a remediation component that automatically generates remediation processes, to automatically update security policies for machines, in accordance with an aspect of the subject innovation.

FIG. 1 illustrates a block diagram of a security system 100 in accordance with an aspect of the subject innovation. The system 100 includes a remediation component 110 that generates remediation processes, to automatically update security policies 120 for machines 132, 134, 136 (1 thru k, where k is an integer), in accordance with an aspect of the subject innovation. The remediation component 110 can automatically determine processes that are required to change and increase compliance of each of the machines 132, 134, 136 with the security policy 120, to improve security level thereof. The remediation component 110 can receive all of settings and scores associated with rules for the security policy 120. Typically, to allow a rule to pass, a particular set of checks associated therewith are required to pass. Accordingly, the remediation component 110 can receive (e.g., as input) data related to benchmarks and pass/fail results that are associated with rules of the security policy 120. The remediation component 110 can initiate at a check level of the rules that have failed to pass, and attempts to tweak settings and verify whether a rule will subsequently pass or fail. The minimum number of changes that can cause a rule to pass can then be determined, such as via a linear programming, e.g., brute force strategy that attempt to make as many conditions pass as possible, and typically without assessing whether the condition belongs to a rule which already is in the pass state—as described in detail infra. Moreover, other methodologies such as: heuristic search strategies; artificial intelligence; and the like can further be employed to determine minimum number of changes that are required to be made for rules to pass, and to further increase system compliance with the security policy 120.

The security policy 120 can include explicitly defined policies or properties and/or more generalized policies or properties, which can be inherited from various portions of a path or region associated with the type of data structure involved. For example, such can include identifying security objectives, creating threat models, applying secure design guidelines (e.g., patterns and principles), conducting security design inspections, performing regular security code inspections, security testing, and conducting security deployment inspections to ensure secure configuration, and the like. Moreover, the security policy 120 can be administered from a global or regionalized location within an associated database, or administered from remote locations outside the database. In addition, the security policy 120 can also retrieve policy modules from a directory domain, a configured set of local policies, or from a local cache. The policy module can then be distributed among machines 132, 134, 136.

The machines 132, 134, 136 can be part of a network such as a system area network or other type of network, and can include several hosts, (not shown), which can be personal computers, servers or other types of computers. Such host generally can be capable of running or executing one or more application-level (or user-level) programs, as well as initiating an I/O request (e.g., I/O reads or writes). In addition, the network can be, for example, an Ethernet LAN, a token ring LAN, or other LAN, or a Wide Area Network (WAN). Moreover, such network can also include hardwired and/or optical and/or wireless connection paths. The connections can be shared among a plurality of the machines 132, 134, 136 that require security updates. Such machines 132, 134, 136 can include, personal computers, workstations, televisions, telephones, and the like for example. Moreover, the networks can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. As such, there mediation component 110 can automatically determine processes that are required to change and increase compliance of the associated machines with the security policy 120.

Figure 2:
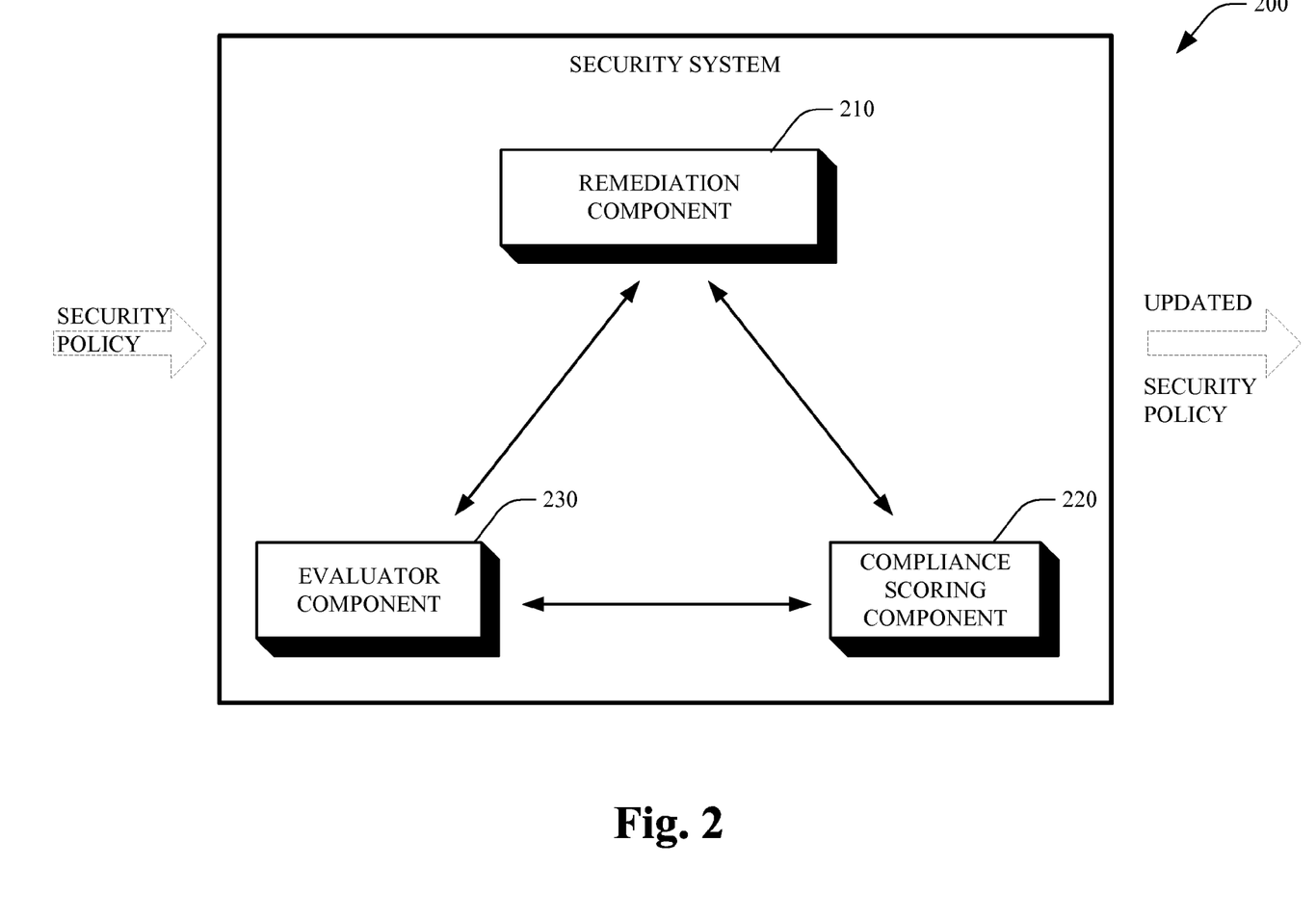
FIG. 2 illustrates a further exemplary aspect of remediation component as part of security compliance in accordance with an aspect of the subject innovation.

FIG. 2 illustrates a related aspect wherein the remediation component 210 can interact with an evaluator component 230 in accordance with an aspect of the subject innovation. The evaluator component 230 can examine a security policy and/or associated benchmark and collect values (e.g., via a parsing component that parses data) related to settings of interests (e.g., for evaluation of the checks and benchmarks.) Moreover, the remediation component 210 can further interact with a compliance scoring component 220. Such compliance scoring component 220 can then examine associated logic of the rules involved (e.g., Boolean Logic), and generate a report of the compliance score. For example, if the score represents 100% the machine is fully compliant with the security policy. Nonetheless, if the score is less then such full compliance, an option exists to supply the data related to the security policy to the remediation component. Subsequently, the remediation component 210 can perform a set of processes to determine further actions to change the system value to increase score of the compliance.

Figure 3:
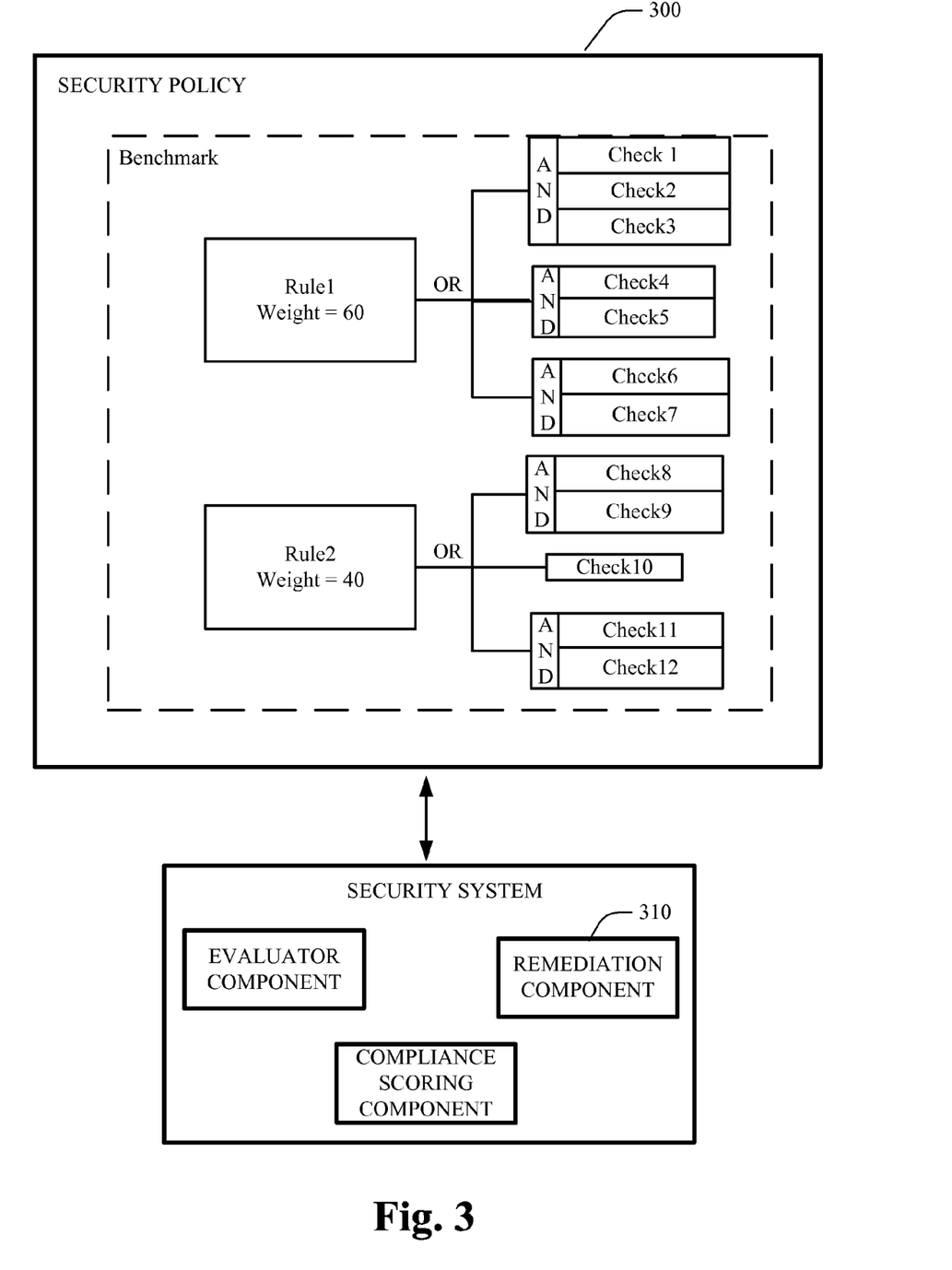
FIG. 3 illustrates a block diagram of a security policy that can be updated via a remediation component according to the subject innovation.

FIG. 3 illustrates an exemplary rule as part of a security policy that can be updated via a remediation component 310 in accordance with an aspect of the subject innovation. In general, a security check can be modeled as a Boolean expression in the form of <system parameter, operator, value> tuple, which if evaluated to true represents a system that passes that particular security check. An example of such a check expressed as a Boolean expression is "Minimum password length>=8 characters". Moreover, such checks can be grouped together into "check collections", which evaluate to true if and only if all the checks in the collection evaluate to true. Accordingly, a rule is evaluated to be true if any one of its check collections evaluates to true, wherein a "weight" representing importance is assigned to every rule. As illustrated in FIG. 3, Rule 1 can have a weight of 60, while Rule 12 can possess a weight of 40, for example.

Figure 4:
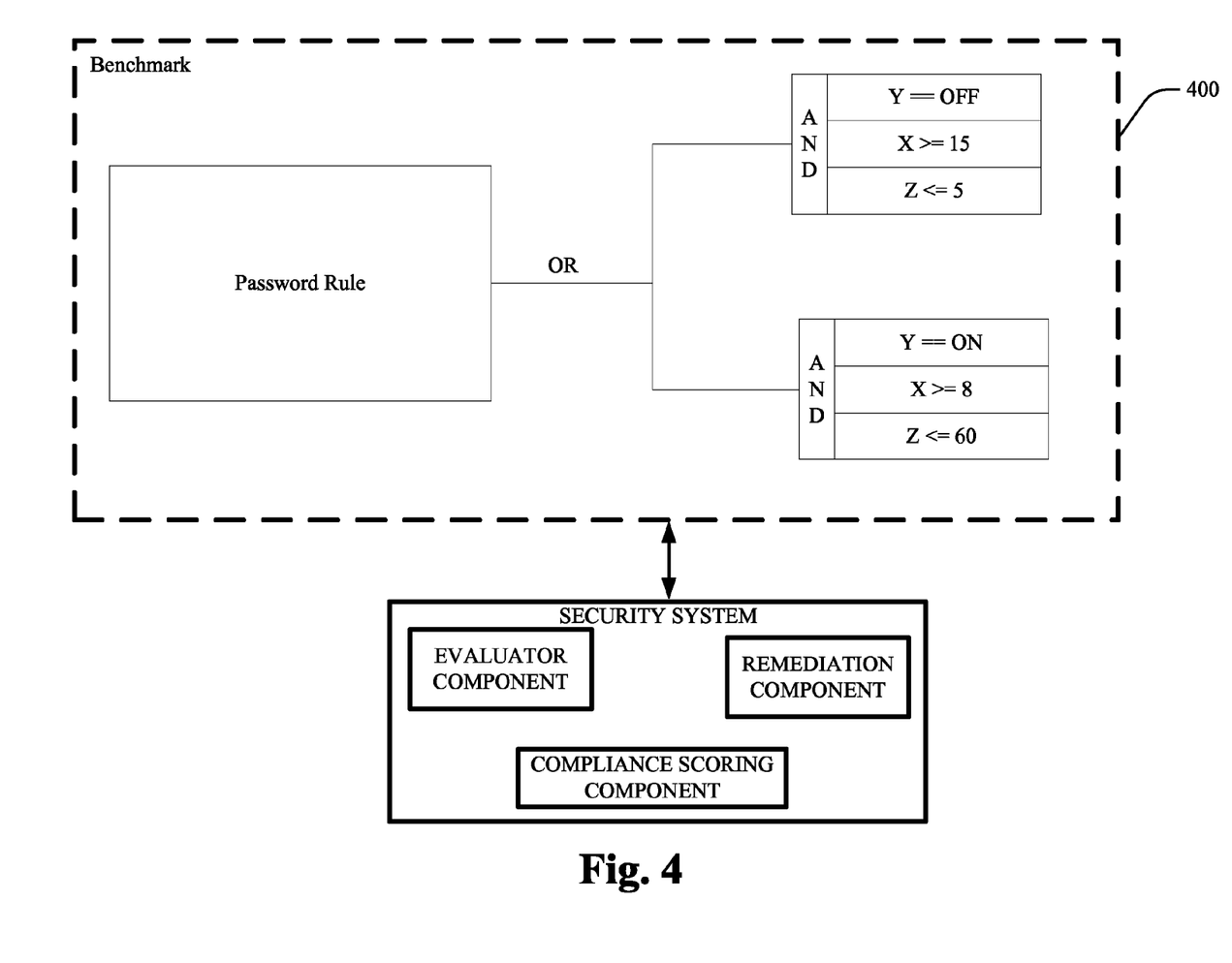
FIG. 4 illustrates an exemplary benchmark for a security policy in accordance with an aspect of the subject innovation.

Furthermore, a benchmark can be defined as a collection of security rules and can be scored for compliance based on weights of rules that evaluate to true. Such score represents the current security compliance level for a particular machine. Consider the following example as illustrated in FIG. 4, for the use of this model to express a security benchmark 400. In this example, a system is deemed to be compliant with regards to password policy if one of the following expressions evaluates to true: 1) If password complexity check is turned off, then passwords must be of length 15 or higher and must be changed every 5 days (or sooner)—OR— 2) If password complexity check is turned on, then passwords must be of length 8 or higher and must be changed every 60 days (or sooner).

wherein:
X: Minimum Password Length Check
Y: Password Complexity Check Check
Z: Password Expiry Duration Check ($Y==$OFF AND $X>=15$ AND $Z<=5$) OR ($Y==$ON AND $X>=8$ AND $Z<=60$)

The above expression can be modeled as a benchmark rule as illustrated in FIG. 4.

Figure 5:
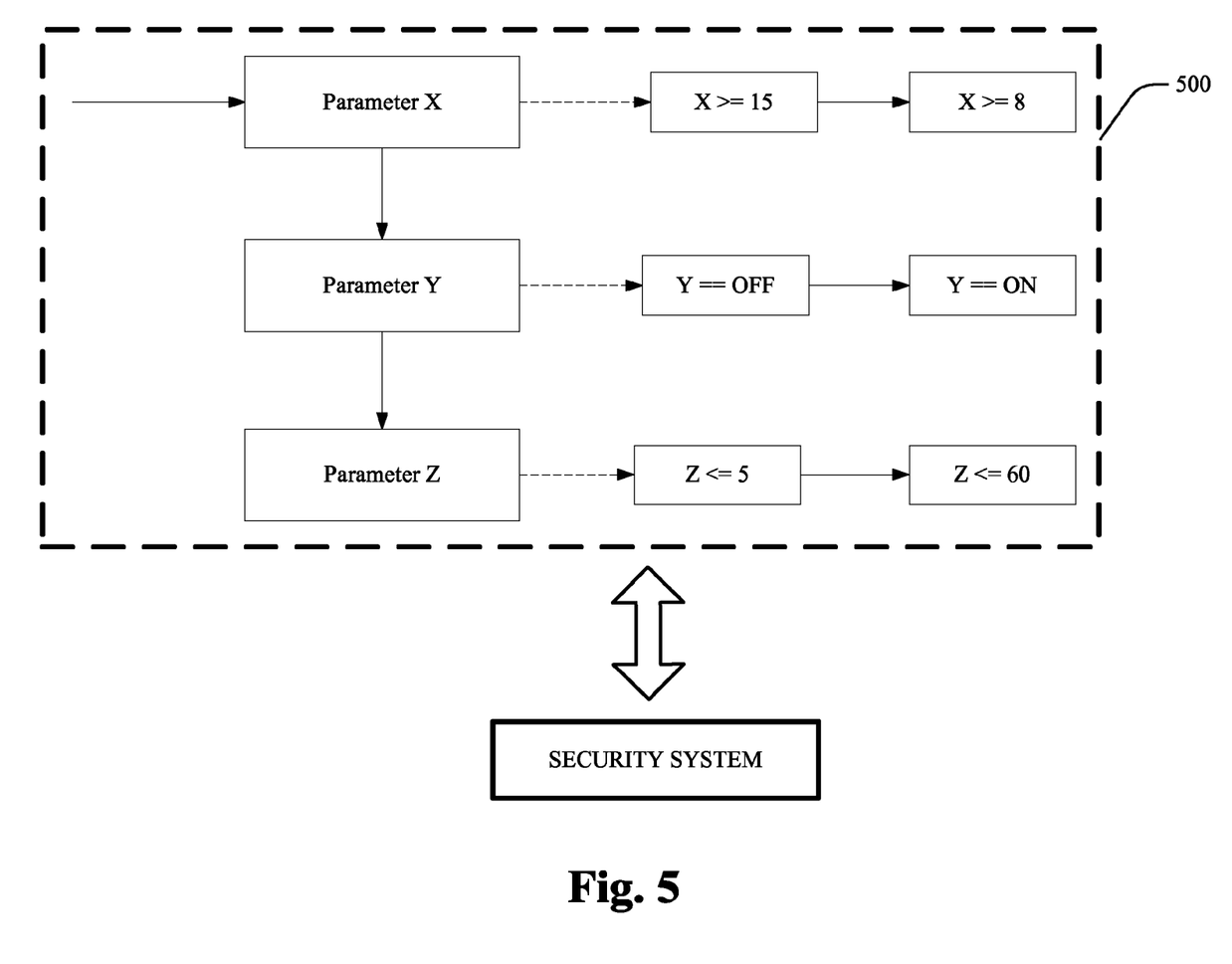
FIG. 5 illustrates an exemplary condition of interest as part of a security policy in accordance with an aspect of the subject innovation.

To supply remediation actions in accordance with an aspect of the subject innovation, initially system parameters of interest can be collected. Accordingly, the benchmark graph can be traversed all the way to leaf nodes, e.g., up to the checks, to build an evaluation table. Such evaluation table can include a list of system parameters that are of interest to this particular benchmark. Corresponding to every system parameter, a list of applicable checks is maintained. FIG. 5 illustrates an evaluation list 500 for a benchmark containing only the password rule from the example above.

The target system can then be analyzed to collect values for system parameters of interest. Such can involve querying the target system for values of parameters of interest by using existing configuration and querying infrastructure. These values can be queried in a single act from the evaluation list by employing collective query APIs or individually if such support in not available. In the above example the system value for parameters X, Y and Z can be obtained, wherein the following values can be assumed to be set on the target system for illustration purposes;

Y=ON: Password complexity enforcement is turned ON
X=10: Minimum password length is set to 10 characters
Z=70: Password expires after 70 days Based on the above assumptions, the conditions of interest can be evaluated as illustrated in FIG. 5, for the example detailed supra. Moreover, rules in the benchmark can be scored based on the condition results. By propagating results of every check upward the benchmark tree and evaluating Boolean conditions for check collections, it can be determined whether a rule evaluates to true or false. For the above example the password rule evaluates to false because neither of the two condition collections evaluate to true. The minimum number of changes that can cause a rule to pass can then be determined—(e.g., via a linear programming such as brute force strategy that attempt to make as many conditions pass as possible, and typically without assessing whether the condition belongs to a rule which already is in the pass state; heuristic search strategies; artificial intelligence; and the like). Such can determine minimum number of changes that are required to be made for rules to pass, and increase system compliance with the policy.

Figure 6:
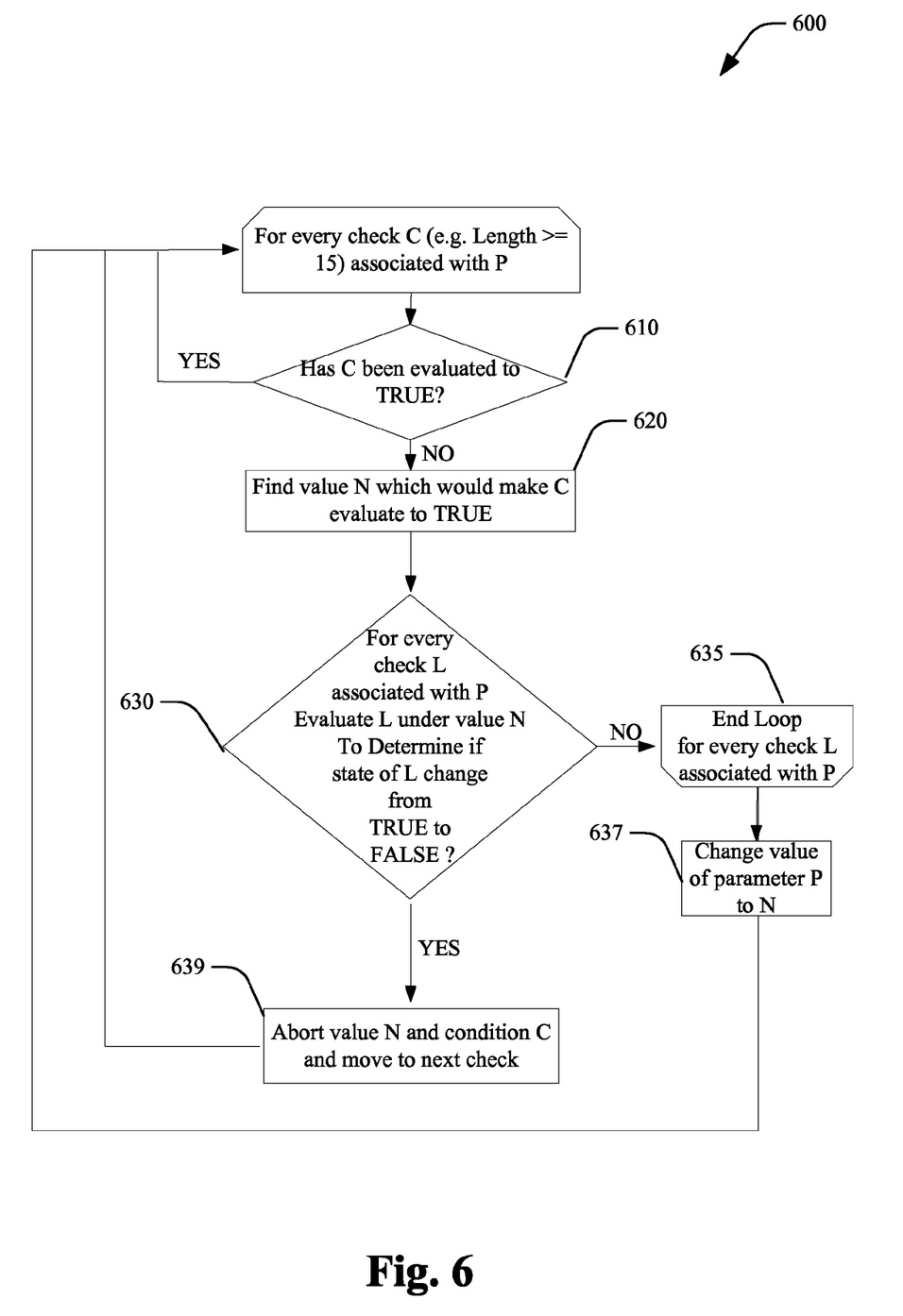
FIG. 6 illustrates a related methodology of determining a minimum number of changes that can cause a rule to pass in accordance with an aspect of the subject innovation.

FIG. 6 illustrates an exemplary methodology 600 of determining a minimum number of changes that can cause a rule to pass in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. The methodology 600 applies to each system parameter "p" (e.g., min pass word length) in evaluation list. At 610 for every security check "c" associated with the parameter value "p" a determination is made whether check c has been evaluated true. If so, the system is compliant with such check and another check can be selected. Otherwise and if not true, the methodology 600 proceeds to act 620, wherein a value N that can make check c to be true is subsequently chosen. At 630 for every other check 1 associated with the parameter p an evaluation is performed under value of N to verify whether state of 1 changes from true to false. If "No" and the value of N does not change to false, the loop can end at 635 and the value of parameter p can be changed to N at 637. Otherwise, the value of N can be discarded at 639 and a next check can be selected at 610. By implementing the methodology 600 to the example described above, the value X is set to 15, and Z to 70.

Figure 7:
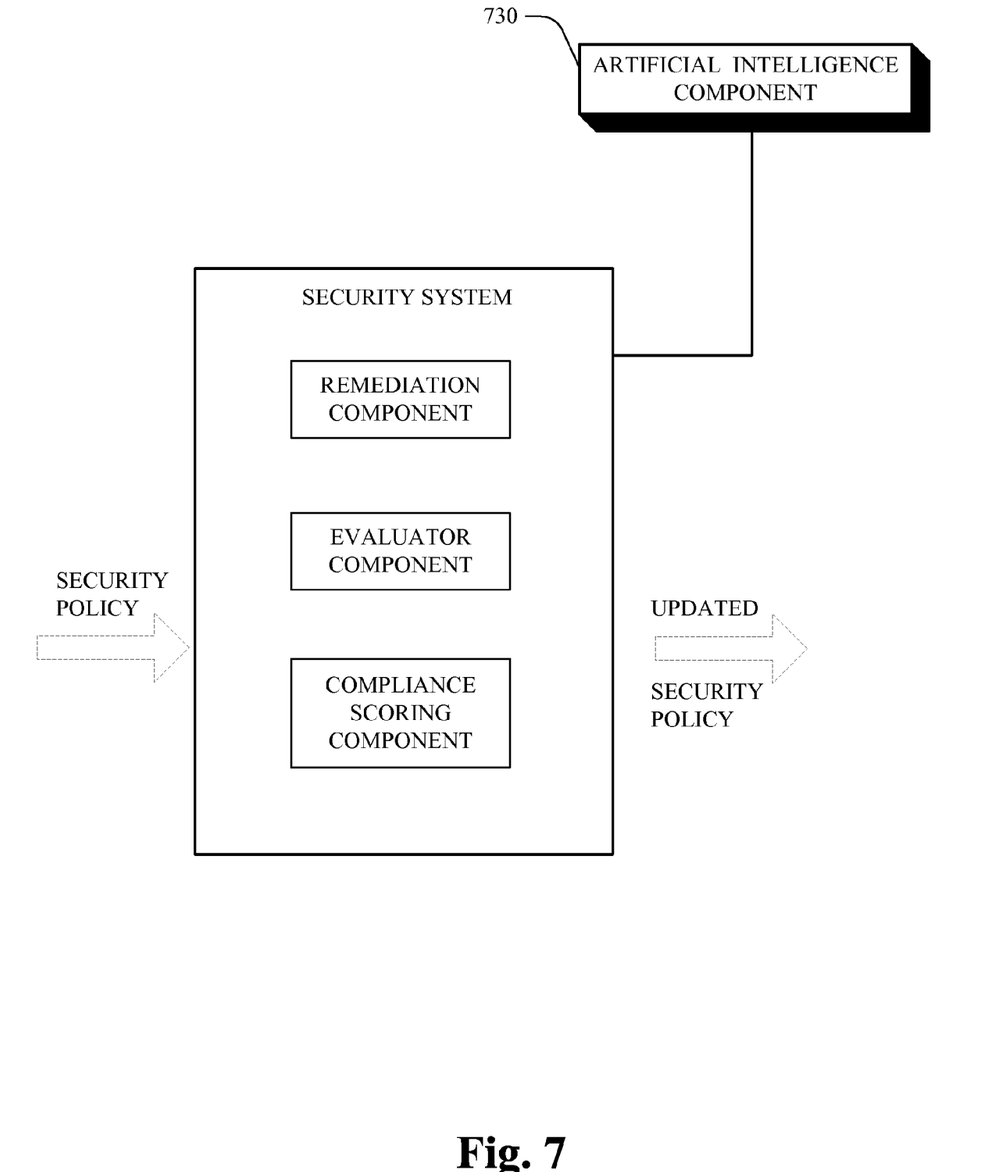
FIG. 7 illustrates a schematic block diagram of an exemplary security system that employs an artificial intelligence component according to an aspect of the subject innovation.

FIG. 7 illustrates an artificial intelligence (AI) component 730 can be employed to facilitate inferring and/or determining when, where, how to determine a minimum number of changes that can cause a rule to pass in accordance with an aspect of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 730 can employ any of a variety of suitable AI-based schemes as described supra in connection with facilitating various aspects of the herein described invention. For example, a process for learning explicitly or implicitly how a security policy should be updated can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$.

Figure 8:
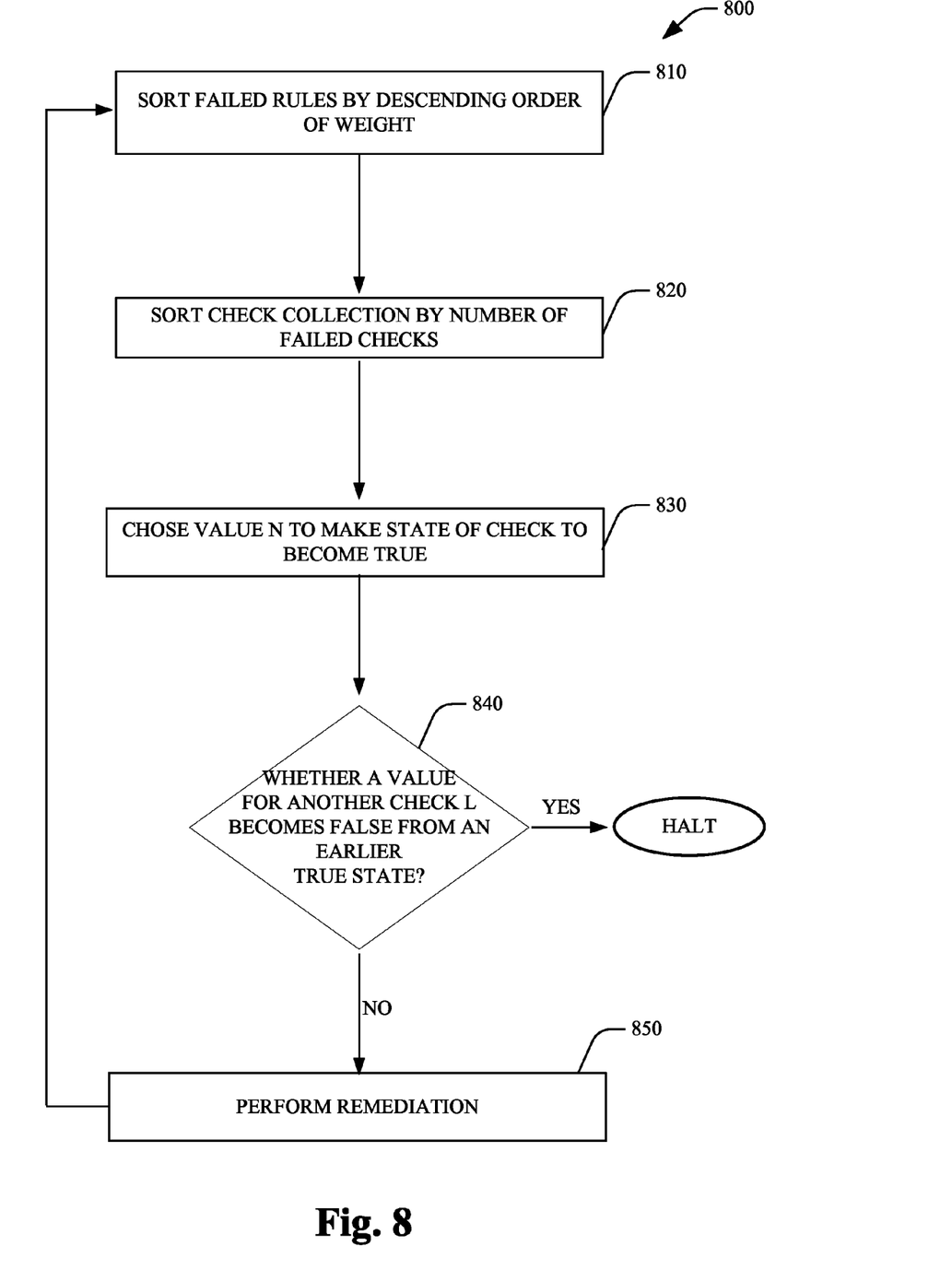
FIG. 8 illustrates a particular methodology based on a heuristic search strategy in accordance with an aspect of the subject innovation.

FIG. 8 illustrates a related methodology based on a heuristic search strategy in accordance with an aspect of the subject innovation. Typically, such Heuristic search attempts to minimize number of essential changes to the system by taking into account principles such as: 1) only change checks related to rules that have failed, 2) change minimum number of checks to make a rule pass; and 3) prioritize the rules based on weights.

Initially and at 810 a list of rules that have failed can be sorted by descending order of weights. Subsequently, and at 820 for each rule in the failed list, the check collection can be sorted by the number of failed checks. Next and at 830, for every failed check a value N can be chosen to make such check to become true. At 840 for another check L for the system parameter a determination is made as to whether a value of L can change from true to false by changing to N. If so, the methodology 800 is halted and fixing such check is aborted. Otherwise, remediation can be performed at 850, and another check is then selected.

Figure 9:
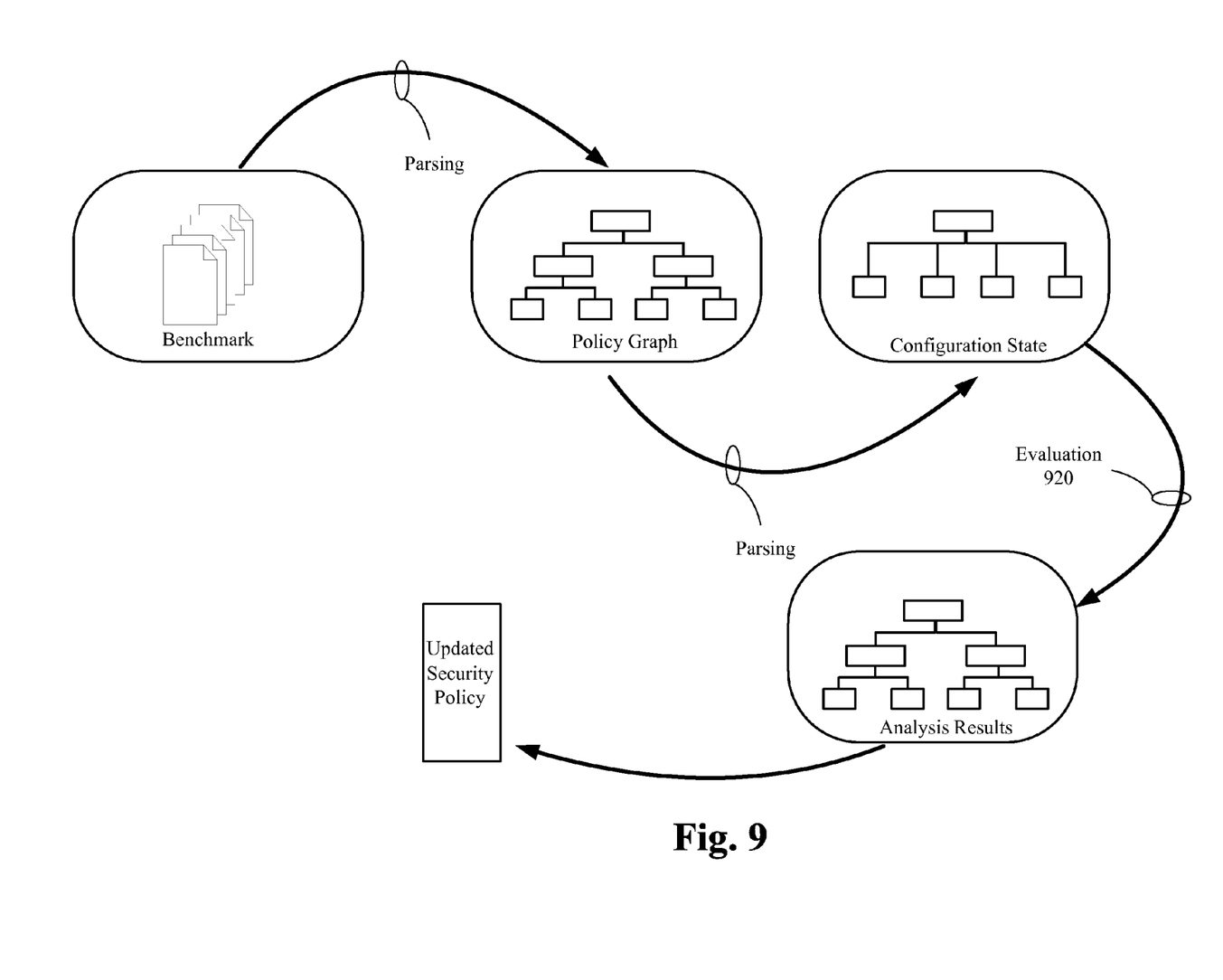
FIG. 9 illustrates a block diagram of various acts that are implemented to obtain an updated security policy in accordance with an aspect of the subject innovation.

FIG. 9 illustrates a block diagram of various acts that are implemented to obtain an updated security policy in accordance with an aspect of the subject innovation. Initially, parameters of interest can be collected, wherein an associated benchmark graph 910 is traversed to leaf nodes (e.g., up to the checks), and an evaluation table generated therefrom. Such evaluation table can include a list of system parameters that are of interest to the particular benchmark. Moreover, corresponding to every system parameter, a list of applicable checks can be maintained.

Moreover, the target system can be analyzed, to collect values for system parameters of interest. Such can involve querying the target system for values of parameters of interest by employing existing configuration and querying infrastructure. For example, these values can be queried in a single act from the evaluation list by using collective query APIs or individually, if such support in not available. Accordingly, every condition of interest can be evaluated 920 to obtain results, and every rule scored in the benchmark based on the condition results. Such can further include propagating results of every check upward the benchmark tree and evaluating Boolean conditions for check collections, to determine whether a rule evaluates to true or false. The remediation action list thus obtained can be applied to target system, and improve an associated compliance score. As such, existing tools and infrastructure can be employed to apply the remediation action list to the target system. In a related aspect, the remediation strategy can initially correct rules that have a higher weight assigned thereto. Moreover, such strategy typically avoids a scenario wherein an earlier passing rule is subsequently failed as a result of the remediation strategy.

Accordingly, administrators can download a policy and supply requisite network modifications, wherein the system is instructed to update non-compliant systems to certain compliance level. The system can automatically generate custom remediation scripts on each machine that is found to be non-compliant. It also applies such remediation script to make all desktops compliant as per administrator requirements and defined levels.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
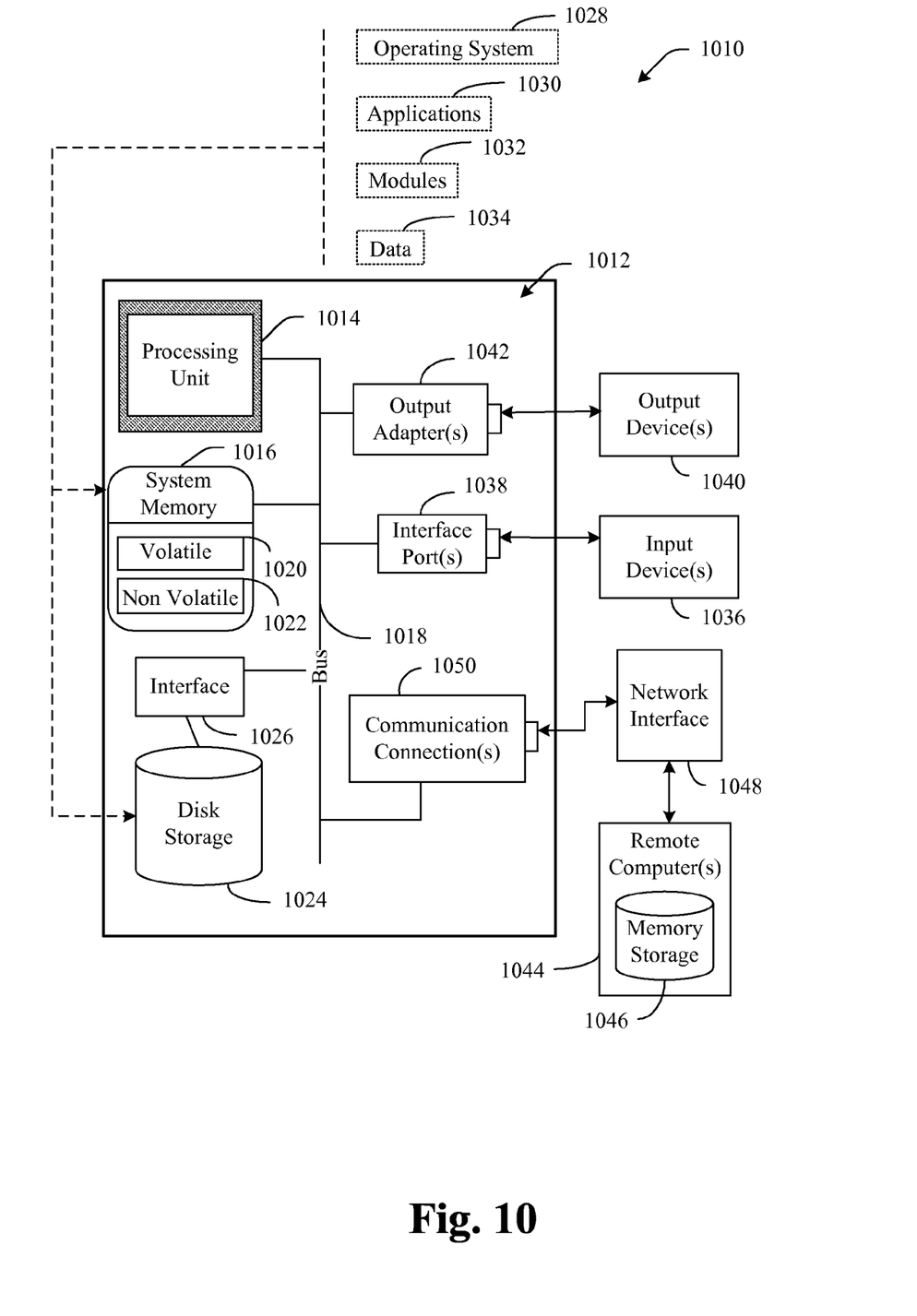
FIG. 10 illustrates an exemplary environment for implementing various aspects of the subject innovation.
Figure 11:
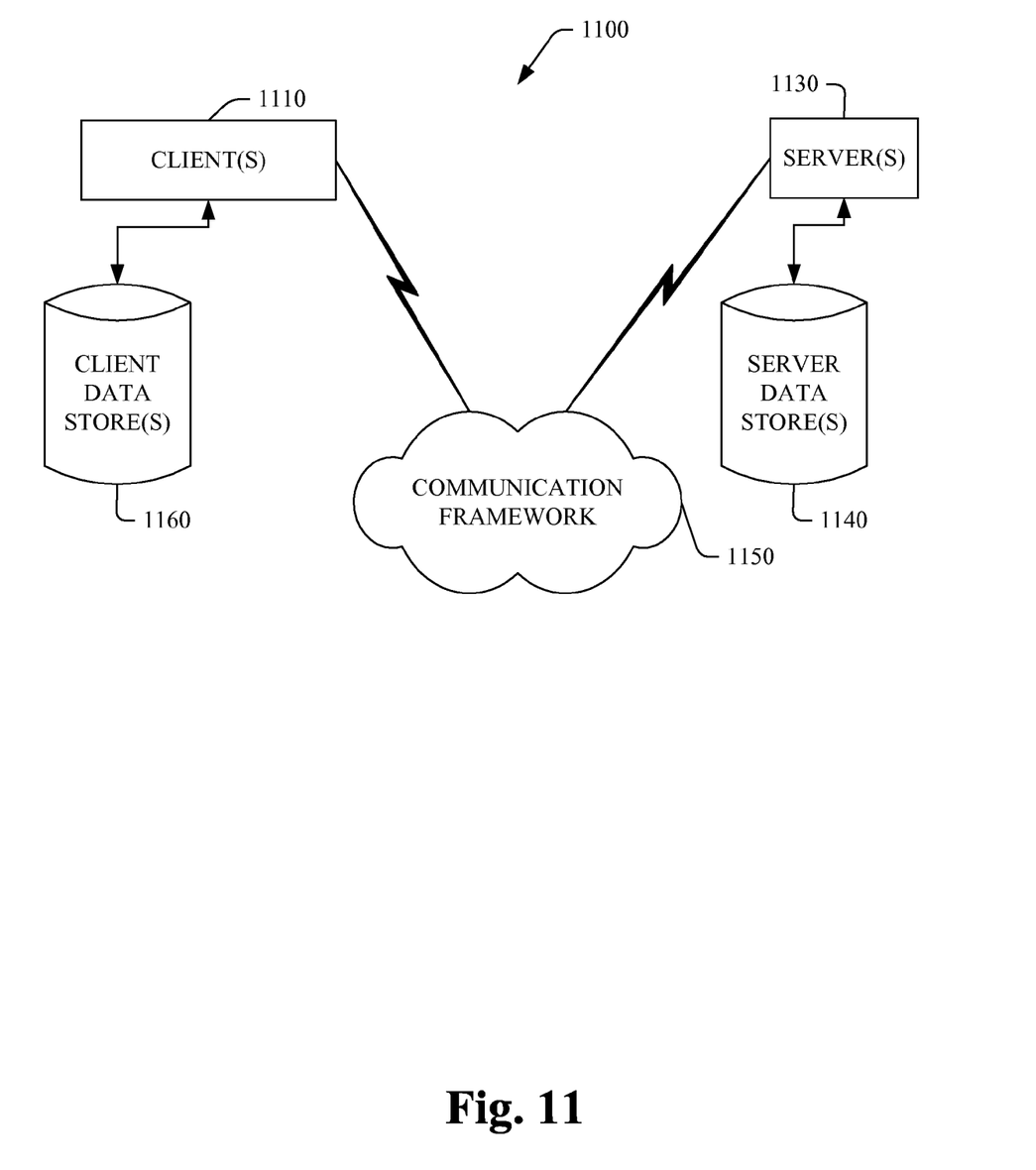
FIG. 11 is a schematic block diagram of a sample-computing environment that can be employed for updating security compliance of machines.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s)

1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for updating security compliance of machines. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system comprising:
at least one processor programmed to act as:
a compliance scoring component to evaluate rules included in a security policy according to corresponding collected values of system parameters of a computing device, a rule comprising one or more Boolean expressions comprising conditional operators and a plurality of corresponding system parameters operated on by the conditional operators such that truth of the rule depends on values of the plurality of corresponding system parameters, and to generate, based on the evaluating, a report on compliance of the computing device with the security policy, the report including a score, the score generated by the compliance scoring component based on weights of the rules, respectively; and
the remediation component to determine, responsive to evaluation of the score, that the computing device is not in compliance with the security policy, and in response the remediation component analyzes rules determined not to be in compliance with the security policy and for each such rule the remediation component identifies a minimal number of changes to the corresponding constituent system parameters of such rule to place the rule in compliance with the security policy, wherein for some rules the corresponding minimal number of changes is less than the corresponding total number of system parameters in the rule.

2. The computer-implemented system of claim 1, wherein the at least one processor is further programmed to act as an evaluator component to collect from the computing device the values of the system parameters.

3. The computer-implemented system of claim 1, wherein the remediation actions comprise changes to be made to the system parameters to change the values thereof.

4. The computer-implemented system of claim 2, wherein the evaluator component comprises a parser that parses data for a benchmark of the security policy.

5. The computer-implemented system of claim 3, wherein the update determining component comprises support vector machine classifiers.

6. The computer-implemented system of claim 1, wherein the remediation component further comprises Bayesian networks, decision trees, or probabilistic classification models.

7. A computer-implemented method comprising:
accessing a security policy comprised of a plurality of rules, each rule comprised of Boolean expressions comprised of operators operating on corresponding system parameters;
according to the security policy, obtaining values corresponding to the system parameters in the rules from a computing device;
generating a compliance score by evaluating the rules according to the obtained values, the compliance score indicating a degree of compliance of the computing device with the security policy; and
responsive to generating the compliance score,
for each rule determined to not be in compliance with the security policy, determining a minimal number of changes to be made to the system parameters corresponding to the rule such that the rule will be in compliance with the security policy, wherein the minimal number of changes is less than the total number of distinct system parameters in the rules, and according to the determined changes, automatically generating remediation processes that will make the determined changes to the computing device, the remediation processes comprising instructions that, when executed, change the system parameters on the computing device such that the computing device complies with the security policy.

8. The computer-implemented method of claim 7 wherein the evaluating comprises determining truth values of the rules according to the values and the boolean operators.

9. The computer-implemented method of claim 7, further comprising:
receiving data related to benchmarks of the security policy.

10. The computer-implemented method of claim 7, further comprising:
traversing a benchmark graph to leaf nodes corresponding to the conditions.

11. The computer-implemented method of claim 10, further comprising:
generating an evaluation table.

12. The computer-implemented method of claim 11, further comprising:
maintaining a list of applicable checks corresponding to the system parameters.

13. The computer-implemented method of claim 7, wherein the rules have respective weights, the method further comprising:
scoring the rules according to the weights.

14. The computer-implemented method of claim 10, further comprising:
propagating results of every check upward in a tree associated with the benchmark.

15. The computer-implemented method of claim 14, further comprising:
evaluating Boolean conditions for check collections to determine validity of a rule.

16. The computer-implemented method of claim 7, wherein the security policy comprises a plurality of rules, each of the rules having a weight, and wherein generating the compliance score indicating the degree of compliance comprises evaluating weights of the rules.

17. A method for remediating a computing device, the method comprising:
obtaining a security policy comprised of a plurality of rules, each rule comprising a logic expression comprised of conditions and Boolean operators, the conditions comprising parameters corresponding to system settings such that some of the rules have a plurality of corresponding system settings, each rule having a weight;
according to the security policy, collecting system setting values of a computing device that correspond to the system settings of the security policy;
evaluating the logic expressions according to the system setting values to determine which of the rules are not satisfied;
according to the evaluating, determining that the computing device does not comply with the security policy, and in response identifying a minimal set of system settings that if changed on the computing device to satisfy corresponding of the conditions would cause the computing device comply with the security policy, the identifying comprising finding frequencies of occurrence of the system settings within the rules determined to be not satisfied and using the frequencies to identify the minimal set of system settings, wherein the minimal set of system settings is less than the total number of system settings in the rules determined to be not satisfied.

18. A method according to claim 17, further comprising automatically generating a remediation script that when executed will modify the minimal set of system settings on the computing device thereby causing the computing device to comply with the security policy.

19. A method according to claim 17, further comprising ordering the rules determined to not be satisfied by the weights thereof, and wherein the identifying the minimal set of system settings is performed by an inference algorithm.

* * * * *